(12) United States Patent
Arakawa et al.

(10) Patent No.: US 6,667,794 B2
(45) Date of Patent: Dec. 23, 2003

(54) COLLIMATOR UTILIZING WAVELENGTH SELECTIVE REFLECTION AND BACKLIGHT SYSTEM

(75) Inventors: Kohei Arakawa, Shizuoka (JP); Fumihiko Mochizuki, Shizuoka (JP); Kenichi Nakagawa, Shizuoka (JP); Mitsuyoshi Ichihashi, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 114 days.

(21) Appl. No.: 09/960,340

(22) Filed: Sep. 24, 2001

(65) Prior Publication Data

US 2002/0036735 A1 Mar. 28, 2002

(30) Foreign Application Priority Data

Sep. 25, 2000 (JP) .......................... 2000-291149
Jul. 26, 2001 (JP) .......................... 2001-225597

(51) Int. Cl.[7] ............... C09K 19/02; G02F 1/1335; G02F 1/13
(52) U.S. Cl. .................... 349/185; 349/96; 349/115; 349/194
(58) Field of Search ............... 349/96, 115, 194, 349/195, 185

(56) References Cited

U.S. PATENT DOCUMENTS 3,679,290 A * 7/1972 Adams et al. ............ 349/199
4,073,571 A * 2/1978 Grinberg et al. ............ 349/194
5,050,966 A * 9/1991 Berman ..................... 349/194
5,325,218 A * 6/1994 Willett et al. ............... 349/74
5,715,023 A * 2/1998 Hoppe ....................... 349/11
5,899,551 A * 5/1999 Neijzen et al. ............. 349/115
6,038,054 A * 3/2000 Sakai et al. ................ 359/253
6,057,008 A * 5/2000 Schwalb et al. ........... 428/1.1
6,307,604 B1 * 10/2001 Hikmet et al. ............. 349/71
6,319,963 B1 * 11/2001 Coates et al. .............. 522/1
2001/0003473 A1 * 6/2001 Galabova et al. .......... 349/98

FOREIGN PATENT DOCUMENTS

JP  2565644  3/1996

* cited by examiner

Primary Examiner—Tarifur R. Chowdhury
(74) Attorney, Agent, or Firm—Sughrue Mion, PLLC (57) ABSTRACT

A flat plate collimator and backlight system capable of improving the display characteristics of liquid crystal display devices are obtained. In order to achieve this end, a collimator is provided which comprises a cholesteric liquid crystal layer exhibiting a selective-reflection wavelength band with respect to perpendicularly-incident light in the wavelength range $\lambda_1$ to $\lambda_2$ ($\lambda_1 < \lambda_2$), and which satisfies the relation $\lambda_0 < \lambda_1$ with respect to the maximum-emission wavelength $\lambda_0$ in the emission spectrum of the light source with which the collimator is used in combination, and a backlight system employing this collimator and light source is provided.

25 Claims, 6 Drawing Sheets

COLLIMATOR UTILIZING WAVELENGTH SELECTIVE REFLECTION AND BACKLIGHT SYSTEM

BACKGROUND OF THE INVENTION

1. Field of the Invention

This invention relates to a flat plate collimator which is able to condense diffuse light into parallel rays, and a backlight system comprising the above collimator; in particular, it relates to a flat plate collimator with improved display characteristics in liquid crystal displays, and a backlight system.

2. Description of the Related Art

A transition is in progress from CRT displays to liquid crystal displays as the display means used in word processors, personal computers, and other office automation equipment.

However, due to the birefringence and optical rotation arising from the alignment of liquid crystals, the viewing angle characteristics of the display contrast and display colors of liquid crystal displays are inferior to those of CRT displays. Consequently there have been attempts to improve the viewing angle characteristics by incorporating phase difference plates (Japanese Patent no. 2565644 publication), and it has been proposed that attempts be made to reduce the adverse effects of the birefringence of liquid crystals by controlling the liquid crystal alignment; however, at present the display characteristics have not reached the level of CRT displays.

One cause of the degradation of display characteristics in liquid crystal displays is the fact that the light incident on the liquid crystal cells is not completely parallel rays, but is diffuse light having a certain spreading. Light incident on a liquid crystal cell at various angles other than the perpendicular may cause degraded display quality due to coloration and other problems. Hence if light in completely parallel rays can be made incident on liquid crystal cells, declines in display characteristics caused by the liquid crystal birefringence would not occur, and the display characteristics could be improved. Here there are in the prior art no members used in liquid crystal displays to change diffuse light into parallel rays, that is, no flat plate collimators, and at most, prism sheets and the like which condense diffuse light are in use in some areas.

The above prism sheets have poor parallel properties, require complex manufacturing processes, and are expensive. Further, it is difficult to form such members as thin films, and there is the danger that use of such members will cause loss of brightness. In no cases were such prism sheets sufficient for practical use.

SUMMARY OF THE INVENTION

This invention was devised in light of the above problems. An object of this invention is to provide a flat plate collimator, not existing in the prior art, which can be manufactured easily and inexpensively.

Another object of this invention is to provide a high-quality backlight system capable of irradiation of parallel rays, and which, when applied to a liquid crystal display in particular, can improve the display contrast, viewing-angle characteristics, and other display characteristics.

That is, in order to resolve the above-described problems, this invention provides the following collimators and backlight systems.

(1) A collimator comprises a cholesteric liquid crystal layer exhibiting a selective reflected wavelength range of wavelengths $\lambda_1$ to $\lambda_2$ ($\lambda_1 < \lambda_2$) for perpendicularly-incident light, and with respect to the wavelength $\lambda_0$ of maximum intensity in the emission spectrum of the light source used in combination, satisfies the relation $\lambda_0 < \lambda_1$.

(2) A collimator comprises a dielectric multilayer film exhibiting a selective reflected wavelength range of wavelengths $\lambda_1$ to $\lambda_2$ ($\lambda_1 < \lambda_2$) for perpendicularly-incident light, and with respect to the wavelength $\lambda_0$ of maximum intensity in the emission spectrum of the light source used in combination, satisfies the relation $\lambda_0 < \lambda_1$.

(3) A backlight system comprises a light-reflecting layer, a light source exhibiting an emission spectrum having emission maximum at wavelength $\lambda_0$, a light-diffusing layer, and the collimator described in (1) above.

(4) A backlight system comprises a light-reflecting layer, a light source exhibiting an emission spectrum having emission maximum at wavelength $\lambda_0$, a light-diffusing layer, and the collimator described in (2) above.

By means of the collimator of this invention, even when light at wavelengths $\lambda_1$ to $\lambda_2$ ($\lambda_1 < \lambda_2$) is incident on the collimator, due to the selective reflection effect of the cholesteric liquid crystal layer or dielectric multilayer film comprised by the collimator, light in the wavelengths $\lambda_1$ to $\lambda_2$ ($\lambda_1 < \lambda_2$) is reflected. On the other hand, when light at the maximum-emission wavelength $\lambda_0$ of the light source, which is not included in the above selective-reflection wavelength band, is incident perpendicularly on the cholesteric liquid crystal layer or dielectric multilayer film, the light is emitted from the collimator as parallel rays. However, in the selective-reflection wavelength band of the cholesteric liquid crystal layer or dielectric multilayer film, light is shifted to shorter wavelengths depending on the angle of incidence $\alpha$. As a result, the wavelength $\lambda_0$ is included in the selective-reflection wavelength band shifted to shorter wavelengths, and when light at wavelength $\lambda_0$ is incident on the cholesteric liquid crystal layer or dielectric multilayer film at an angle of incidence $\alpha(\alpha>0)$, it is reflected due to the selective-reflection effect of the cholesteric liquid crystal layer or dielectric multilayer film. Hence only light at wavelength $\lambda_0$ from the above light source, incident normal to the above cholesteric liquid crystal layer or dielectric multilayer film, can pass through the above cholesteric liquid crystal layer or dielectric multilayer film, and only parallel rays are emitted.

The selective-reflection wavelength band and other optical characteristics of the above cholesteric liquid crystal layer or dielectric multilayer film can easily be adjusted by selecting materials and controlling the alignment, so that the above collimator can easily be constructed. And, by selecting materials and controlling the alignment, the above-described function can be realized even when the thickness of the cholesteric liquid crystal layer or dielectric multilayer film is made thin, so that demands for thinness can be satisfied.

In this invention, "perpendicular incidence" signifies incidence perpendicular to the collimator. The angle of incidence a refers to the angle of incidence of light relative to the above-mentioned helical axis, and may be defined for example as a in FIG. 2. Further, in this invention "cholesteric liquid crystal layer" refers to a cholesteric liquid crystal layer the helical axis of which is substantially in the normal direction to the cholesteric liquid crystal layer, that is, the Grandjean alignment.

In the backlight system of this invention, light which cannot pass through the above cholesteric liquid crystal layer or dielectric multilayer film and is reflected has its direction of propagation disordered by the light-diffusing layer, and is again incident on the above cholesteric liquid crystal layer or dielectric multilayer film. Or, after being reflected by the light-reflecting layer, light is again incident on the above cholesteric liquid crystal layer or dielectric multilayer film. By repeating this process, light from the light source is formed into parallel rays by the collimator of his invention.

Hence by means of the backlight system of this invention, parallel rays can be irradiated, and when applied to a liquid crystal display, the backlight system can contribute greatly to improvement of the display contrast and broadening of viewing angles.

DESCRIPTION OF THE PREFERRED EMBODIMENTS

Below, aspects of the collimator and backlight system of this invention are explained, referring to the drawings.

Figure 1:
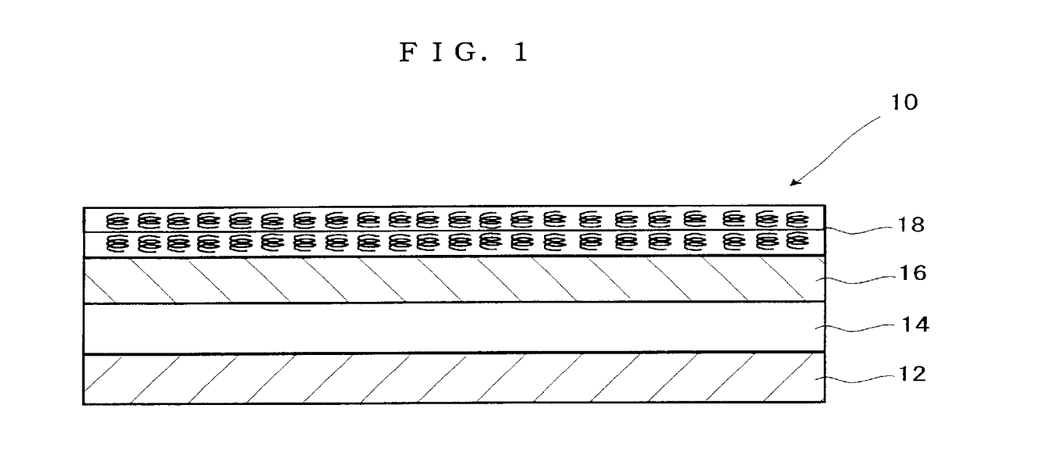
FIG. 1 is a cross-sectional view which shows schematically an example of a backlight system of this invention.

FIG. 1 is a schematic cross-sectional view which shows an example of a backlight system 10 of this invention.

This backlight system 10 comprises an arrangement, in order, of a light-reflecting layer 12, light source 14, light-diffusing layer 16, and collimator 18.

The light-reflecting layer 12 formed from aluminum or similar metal thin film, has the function of reflecting and returning incident light in the direction of the collimator 18, and is positioned on the back side of the light source 14.

On the side of the light source 14 opposite the light-reflecting layer 12 is positioned a light-diffusing layer 16. This light-diffusing layer 16 is a polymer sheet or film in which is dispersed a white inorganic powder or similar to endow the layer with light-diffusing properties, and has the function of diffusing incident light.

The light source 14 is a flat-plate-like emission body, the emission spectrum of which has an emission peak at the wavelength $\lambda_0$.

Figure 5:
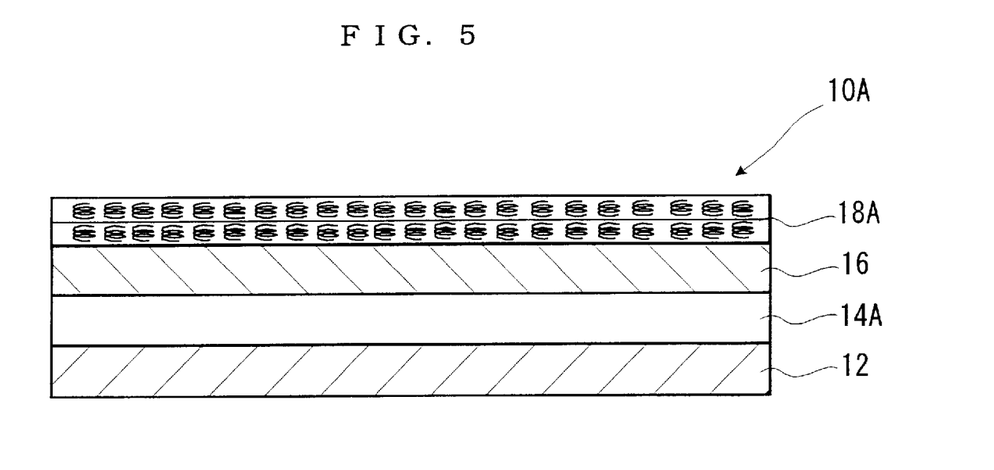
FIG. 5 is a cross-sectional view which shows schematically an example of a backlight system of this invention.

Next, FIG. 5 is a schematic cross-sectional view which shows an example of a backlight system 10A of this invention. This backlight system 10A is an example of application to the backlight system of a full-color display. In the backlight system of this FIG. 5, parts which are the same as in FIG. 1 are assigned the same reference symbols, and explanations are omitted.

This backlight system 10A comprises an arrangement, in order, of a light-reflecting layer 12, light source 14A, light-diffusing layer 16, and collimator 18A.

The light source 14A is a three-wavelength-type cold-cathode tube, exhibiting an emission spectrum which has peak wavelengths at $\lambda_B$ (420 to 480 nm, and preferably 431 nm to 439 nm), $\lambda_G$ (520 nm to 580 nm, and preferably 539 nm to 551 nm) and $\lambda_R$ (585 nm to 685 nm, and preferably 604 nm to 616 nm), corresponding to blue, green and red, respectively. In this case, the surface of the light-reflecting layer 12 may be a curved surface having a prescribed curvature, configured to enable efficient reflection of light from the light source 14A.

Below, aspects employing a cholesteric liquid crystal layer and dielectric multilayer film, as the film materials comprised by the above collimators 18, 18A, are explained in detail.

Cholesteric Liquid Crystal Layer

Figure 2:
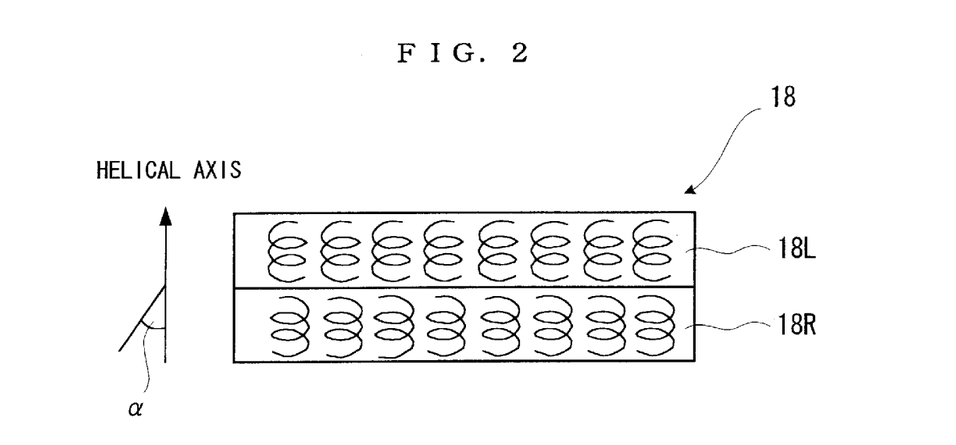
FIG. 2 is a cross-sectional view which shows schematically an example of a collimator, formed from a cholesteric liquid crystal layer, of this invention.

FIG. 2 is an enlarged cross-sectional view for the case in which a cholesteric liquid crystal layer is used as the film material comprised by the collimator 18.

The collimator 18 comprises a stack of a clockwise-rotating helically-oriented cholesteric liquid crystal layer 18R, and a counterclockwise-rotating helically-oriented cholesteric liquid crystal layer 18L. The helical pitches, average refractive indices and birefringence Δn of the cholesteric liquid crystal layers 18R and 18L are in substantial agreement. The selective-reflection central wavelengths of the cholesteric liquid crystal layers 18R and 18L are determined by the product of the helical pitch and the average refractive index, and the selective-reflection wavelength band is determined by the product of the helical pitch and the birefringence Δn. The helical pitches, average refractive indices and birefringence Δn of the cholesteric liquid crystal layers 18R and 18L are in substantial agreement, and so the selective-reflection central wavelength and selective-reflection wavelength band are in substantial agreement.

Figure 4:
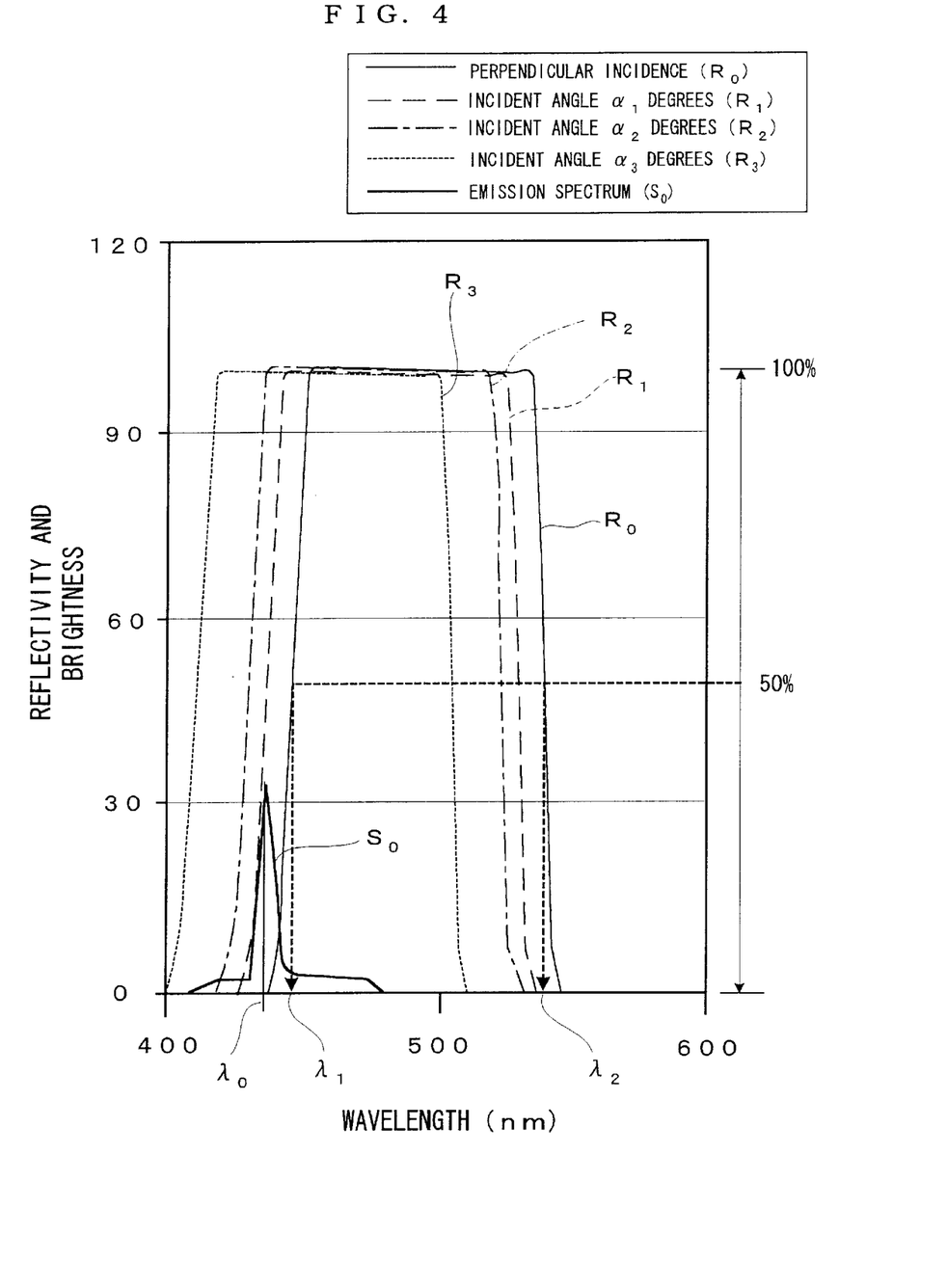
FIG. 4 is a graph showing the emission spectrum of a light source which can be used in this invention, and the selective-reflection wavelength bands of a cholesteric liquid crystal layer or a dielectric multilayer film.

FIG. 4 shows the emission spectrum of the light source 14, the selective-reflection wavelength band of the cholesteric liquid crystal layer 18R (or 18L), and the dependence of same on the angle of incidence.

The light source 14 exhibits an emission spectrum $S_0$ having an emission peak at the wavelength $\lambda_0$ (435 nm). On the other hand, the cholesteric liquid crystal layer 18R (or 18L) has a selective-reflection wavelength band $R_0$ for perpendicularly-incident light in the wavelength range $\lambda_1$ to $\lambda_2$ ($\lambda_1 < \lambda_2$). When light is incident at an angle other than perpendicular to the cholesteric liquid crystal layer 18R (or 18L), this selective-reflection wavelength band $R_0$ is shifted to shorter wavelengths according to the angle of incidence. As shown in FIG. 4, the cholesteric liquid crystal layer 18R (or 18L) has selective-reflection wavelength bands $R_1$, $R_2$ and $R_3$, shifted toward shorter wavelengths from $R_0$ for light incident at angles $\alpha_1$, $\alpha_2$ and $\alpha_3$ ($\alpha_1 < \alpha_2 < \alpha_3$; for example, $\alpha_1 = 10°$, $\alpha_2 = 20°$, $\alpha_3 = 40°$). That is, the wavelength $\lambda_0$ is included in each of the selective-reflection wavelength bands $R_1$, $R_2$ and $R_3$, and the circularly-polarized component of the wavelength $\lambda_0$ incident on the cholesteric liquid crystal layer 18R (or 18L) at the angles $\alpha_1$, $\alpha_2$ or $\alpha_3$ is reflected (the clockwise circularly-polarized component by the cholesteric liquid crystal layer 18R, and the counterclockwise circularly-polarized component by the cholesteric liquid crystal layer 18L).

When light is incident at an angle $\alpha$(see FIG. 2) with respect to the helical axis of the cholesteric liquid crystal layer, the selective-reflection central wavelength $\lambda(\alpha)$ exhibited by the cholesteric liquid crystal layer (of average refractive index n) is expressed by the following equation (1), when $\lambda$ is the selective-reflection central wavelength for perpendicularly-incident light.

$$\lambda(\alpha)=\lambda\cos\{\sin^{-1}(\sin\alpha/n)\} \quad (1)$$

Again in FIG. 1, light (of wavelength $\lambda_0$) irradiated from the light source 14 is incident on the light-diffusing layer 16 (either directly, or after reflection by the light-reflecting layer 12), the direction of propagation is dispersed, and the light is incident on the collimator 18.

First, the manner in which the clockwise circularly-polarized component is rendered into parallel rays by the collimator 18 is explained.

Of the clockwise circularly-polarized components incident on the collimator 18, light which is perpendicularly incident on the cholesteric liquid crystal layer 18R comprised by the collimator 18 satisfies the relation $\lambda_0<\lambda_1$, and so is not selectively reflected, but passes through the cholesteric liquid crystal layer 18R, and is perpendicularly incident on the cholesteric liquid crystal layer 18L. This incident component, which is clockwise circularly-polarized, rotates in the direction opposite the helical rotation direction of the cholesteric liquid crystal layer 18L, and so continues unchanged as parallel rays and is emitted from the collimator 18.

However, when clockwise circularly-polarized components are incident on the cholesteric liquid crystal layer 18R at angles $\alpha_1$, $\alpha_2$ and $\alpha_3$, because the selective-reflection wavelength band of the cholesteric liquid crystal layer 18R is shifted to shorter wavelengths according to each of these angles of incidence, the wavelength $\lambda_0$ is also included in one of the selective-reflection wavelength bands $R_1$, $R_2$ or $R_3$, and so is reflected. The direction of propagation of the reflected light is again scattered by the light-diffusing layer 16, and the light is again incident on the cholesteric liquid crystal layer 18R, together with light from the light source 14 and light reflected from the light-reflecting layer 12. Of this, only light which is perpendicularly incident on the cholesteric liquid crystal layer 18R becomes parallel rays as a result of action similar to that previously described, and is emitted from the collimator 18. Of the clockwise circularly-polarized component reflected by the cholesteric liquid crystal layer 18R and incident on the light-diffusing layer 16, the clockwise circularly-polarized component which propagates in the direction of the light-reflecting layer 12 is reflected by the light-reflecting layer 12, is converted into a counterclockwise circularly-polarized component, and is again incident on the collimator 18.

The parallel rays of the counterclockwise circularly-polarized component incident on the collimator 18 are here explained. Counterclockwise circularly-polarized light components are rotated in the direction opposite the helical rotation direction of the cholesteric liquid crystal layer 18R, and so pass through unchanged and are incident on the cholesteric liquid crystal layer 18L. Of the incident counterclockwise circularly-polarized components, light which is perpendicularly incident on the cholesteric liquid crystal layer 18L satisfies the relation $\lambda_0<\lambda_1$, and so is not reflected but passes through the cholesteric liquid crystal layer 18L unchanged, and is emitted as parallel rays. However, when counterclockwise circularly-polarized components are incident on the cholesteric liquid crystal layer 18L at angles $\alpha_1$, $\alpha_2$ or $\alpha_3$, because the selective-reflection wavelength band exhibited by the cholesteric liquid crystal layer 18L is shifted to shorter wavelengths according to the angle of incidence, the wavelength $\lambda_0$ is also included in one of the selective-reflection wavelength bands $R_1$, $R_2$ or $R_3$, and so is reflected. As with the above-described clockwise circularly-polarized components, the reflected light repeatedly passes through similar optical paths, becomes nearly completely changed to parallel rays, and is emitted from the collimator 18.

In this way, the collimator 18 can cause circularly-polarized components of both types to be changed into nearly completely parallel rays and emitted.

Figure 6:
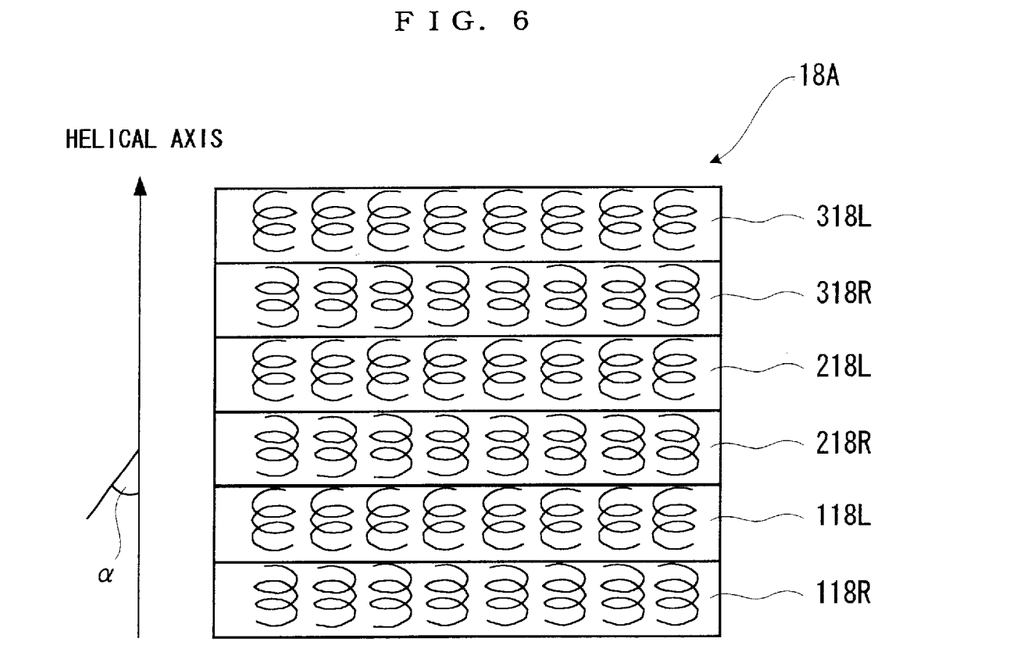
FIG. 6 is a cross-sectional view which shows schematically an example of a collimator, formed from a cholesteric liquid crystal layer, of this invention.

Next, FIG. 6 is an enlarged cross-sectional view of the cholesteric liquid crystal layers comprised by a collimator 18A of this invention.

The collimator 18A comprises a stack of a cholesteric liquid crystal layer 118R with clockwise helical arrangement, and cholesteric liquid crystal layer 118L with counterclockwise helical arrangement; a cholesteric liquid crystal layer 218R with clockwise helical arrangement, and cholesteric liquid crystal layer 218L with counterclockwise helical arrangement; and a cholesteric liquid crystal layer 318R with clockwise helical arrangement, and cholesteric liquid crystal layer 318L with counterclockwise helical arrangement.

The helical pitches, average refractive indices and birefringence $\Delta n$ of the cholesteric liquid crystal layers 118R and 118L are in substantial agreement. The helical pitches, average refractive indices and birefringence $\Delta n$ of the cholesteric liquid crystal layers 218R and 218L are in substantial agreement. And, the helical pitches, average refractive indices and birefringence $\Delta n$ of the cholesteric liquid crystal layers 318R and 318L are in substantial agreement. Hence the selective-reflection wavelength bands of the cholesteric liquid crystal layers 118R and 118L are in substantial agreement, as are the selective-reflection wavelength bands of the cholesteric liquid crystal layers 218R and 218L, and the selective-reflection wavelength bands of the cholesteric liquid crystal layers 318R and 318L.

Figure 8:
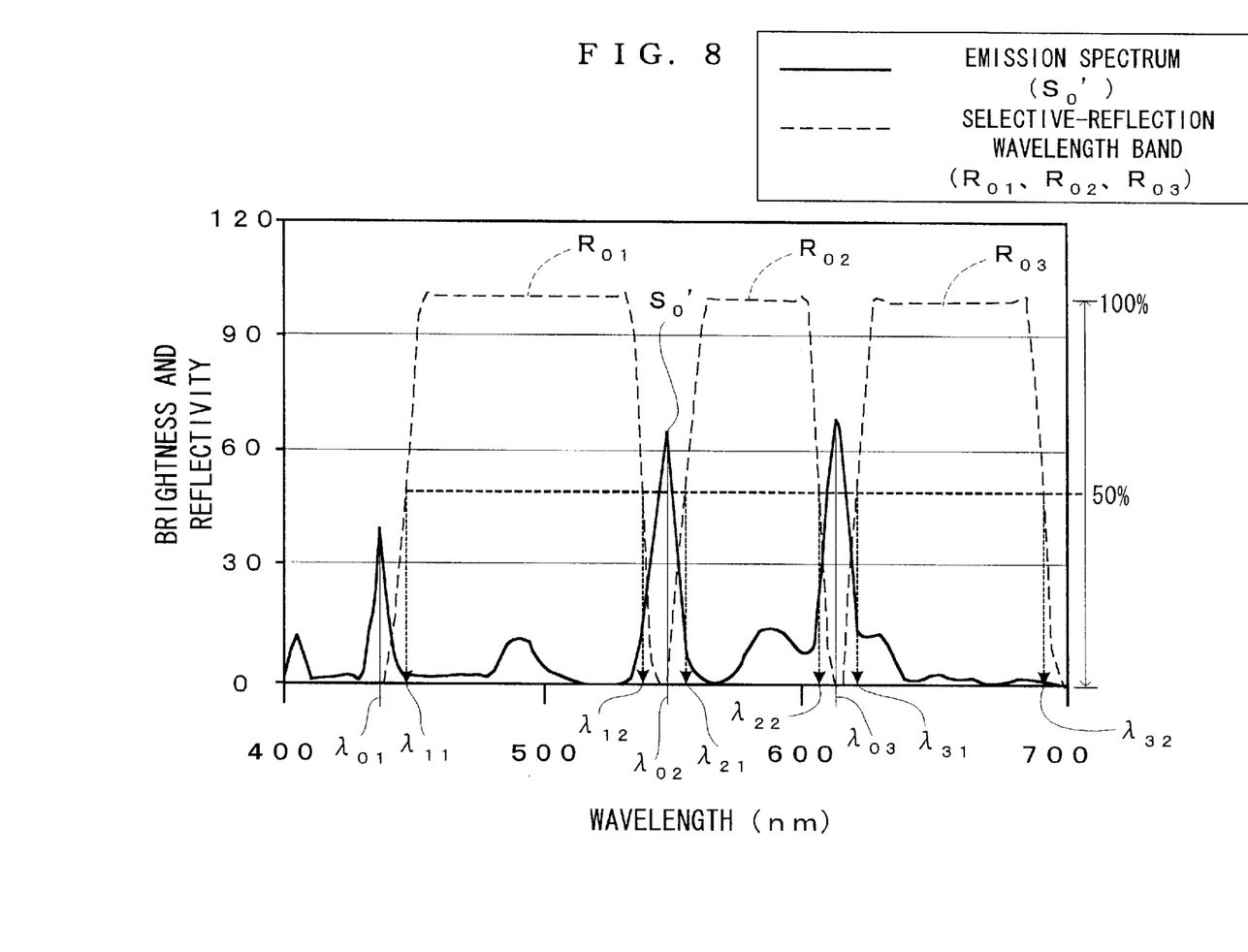

FIG. 8 shows the emission spectrum of the light source 14A and the selective-reflection wavelength bands of the cholesteric liquid crystal layers 118R (or 118L), 218R (or 218L), and 318R (or 318L).

The light source 14A exhibits an emission spectrum having emission peaks at the wavelengths $\lambda_B$, $\lambda_G$ and $\lambda_R$. The cholesteric liquid crystal layer 118R (or 118L) has a selective-reflection wavelength band $R_{01}$ for perpendicularly-incident light at the wavelengths $\lambda_{11}$ to $\lambda_{12}$ ($\lambda_{11}<\lambda_{12}$); the cholesteric liquid crystal layer 218R (or 218L) has a selective-reflection wavelength band $R_{02}$ for perpendicularly-incident light at the wavelengths $\lambda_{21}$ to $\lambda_{22}$ ($\lambda_{21}<\lambda_{22}$); and the cholesteric liquid crystal layer 318R (or 318L) has a selective-reflection wavelength band $R_{03}$ for perpendicularly-incident light at the wavelengths $\lambda_{31}$ to $\lambda_{32}$ ($\lambda_{31}<\lambda_{32}$). These wavelengths satisfy the following relation:

$$\lambda_B<\lambda_{11}<\lambda_{12}<\lambda_G<\lambda_{21}<\lambda_{22}<\lambda_R<\lambda_{31}<\lambda_{32}<1000 \text{ nm}$$

When light is incident at an angle other than perpendicular to the cholesteric liquid crystal layers 118R (or 118L), 218R (or 218L) and 318R (or 318L), the selective-reflection wavelength bands $R_{01}$ $R_{02}$, $R_{03}$ are shifted to shorter wavelengths according to the angle of incidence. For example, similarly to the incident angle dependence of the selective-reflection wavelength band for the cholesteric liquid crystal layer 18R shown in FIG. 4, for light incident at angles $\alpha_1$, $\alpha_2$ and $\alpha_3$ ($\alpha_1 < \alpha_2 < \alpha_3$; for example, $\alpha_1 = 10°$, $\alpha_2 = 20°$, $\alpha_3 = 40°$), the cholesteric liquid crystal layer 118R (or 118L) has selective-reflection wavelength bands $R_{11}$, $R_{12}$ and $R_{13}$ (none shown), all shifted to shorter wavelengths than $R_{01}$. The wavelength $\lambda_B$ is included in all of $R_{11}$, $R_{12}$ and $R_{13}$, and a circularly-polarized component of wavelength $\lambda_B$ (for cholesteric liquid crystal layer 118R, clockwise circularly-polarized components; for 118L, counterclockwise circularly-polarized components) incident on the cholesteric liquid crystal layer 118R (or 118L) at the angles $\alpha_1$, $\alpha_2$ or $\alpha_3$ is reflected.

Similarly, the cholesteric liquid crystal layers 218R (or 218L) and 318R (or 318L) have selective-reflection wavelength bands which are each shifted to shorter wavelengths than $R_{02}$ and $R_{03}$ for light incident at angles other than perpendicular. The wavelengths $\lambda_G$ and $\lambda_R$ are respectively included in these selective-reflection wavelength bands shifted to shorter wavelengths, and light at wavelengths $\lambda_G$ and $\lambda_R$ which is incident on the cholesteric liquid crystal layers 218R (or 218L) and 318R (or 318L) at angles other than perpendicular is reflected.

Once again, in FIG. 5, light irradiated from the light source 14A (wavelengths $\lambda_B$, $\lambda_G$ and $\lambda_R$) is incident (either directly, or after reflection by the light-reflecting layer 12) on the light-diffusing layer 16 the direction of propagation is scattered, and the light is incident on the collimator 18A. The clockwise and counterclockwise circularly-polarized components at wavelength $\lambda_B$ are changed into parallel rays by the cholesteric liquid crystal layers 118R and 118L, the clockwise and counterclockwise circularly-polarized components at wavelength $\lambda_G$ are changed into parallel rays by the cholesteric liquid crystal layers 218R and 218L, and the clockwise and counterclockwise circularly-polarized components at wavelength $\lambda_R$ are changed into parallel rays by the cholesteric liquid crystal layers 318R and 318L. As a result, parallel rays of light at three wavelengths corresponding to blue, green and red are emitted from the collimator 18A.

A backlight system of this invention may comprise, as desired and according to the application, a light-guiding plate, polarizing filter, and similar components.

Next, the cholesteric liquid crystal layers comprised by the collimator of this invention are explained in further detail.

A collimator of this invention comprises at least one, and preferably three, cholesteric liquid crystal layers. For perpendicularly incident light, these cholesteric liquid crystal layers are characterized in having a selective-reflection wavelength band in the wavelength range $\lambda_1$ to $\lambda_2$ ($\lambda_1 < \lambda_2$), and in satisfying the relation $\lambda_0 < \lambda_1$ for the maximum-emission wavelength $\lambda_0$ in the emission spectrum of the light source with which the collimator is combined for use. Here, the central wavelength of the selective-reflection wavelength band is determined by the helical pitch and the average refractive index of the cholesteric liquid crystal layer, and the selective-reflection wavelength band is determined by the helical pitch and the birefringence $\Delta n$ of the cholesteric liquid crystal layer. Hence by selecting the materials which comprise the cholesteric liquid crystal layer, and by controlling their alignment, a cholesteric liquid crystal layer can be obtained which satisfies the above relation with respect to the emission peak wavelength $\lambda_0$ of the light source with which the collimator is combined.

Here it is desirable that the difference between the maximum-value wavelength $\lambda_2$ and the minimum-value wavelength $\lambda_1$ of the selective-reflection wavelength band exhibited by the above cholesteric liquid crystal layers be 50 nm or greater, and more preferably be 70 nm or greater. If the difference between the maximum-value wavelength $\lambda_2$ and the minimum-value wavelength $\lambda_1$ is 50 nm or less, moderately oblique light is cut out, but as the angle of incidence increases, there is the possibility that light may again be transmitted.

It is preferable that the above cholesteric liquid crystal layers satisfy the relation $(\lambda_1 - \lambda_0) \leq 20$ nm. If this relation is satisfied, even when combined and used in a backlight exhibiting a sharp emission spectrum, with an emission spectrum half-band width of 20 nm or less, emitted light can be obtained which is scattered within only $\pm 10°$ from completely parallel rays, and a collimator with sufficient characteristics for practical use is obtained. Further, even when combined and used with a backlight exhibiting a still sharper emission spectrum, with an emission spectrum half-band width of 15 nm or less, if $(\lambda_1 - \lambda_0) \leq 10$ nm is satisfied, emitted light can be obtained which is scattered within only $\pm 10°$ from completely parallel rays, and a collimator with sufficient characteristics for practical use is obtained.

When changing diffuse light which includes both clockwise circularly-polarized components and counterclockwise circularly-polarized components into parallel rays of light, it is preferable that at least two cholesteric liquid crystal layers with mutually different helical rotation directions be stacked to form the collimator. There are no restrictions in particular on the order of stacking of the cholesteric liquid crystal layers. If the helical pitches, average refractive indices and birefringence $\Delta n$ of each of the cholesteric liquid crystal layers are made to coincide, then the selective-reflection wavelength bands and their incident angle dependences will be equal, and so it is possible to render equal the extents to which both clockwise and counterclockwise circularly-polarized components are changed into parallel rays, which is preferable. Here "coincidence" means "substantial coincidence"; as explained above, the extents to which light is changed into parallel rays are the same for both circularly-polarized components, and so this "coincidence" signifies coincidence to the extent that there is no prominent appearance of imbalance in the rendering into parallel rays of both circularly-polarized components, even when applied to liquid crystal display elements, liquid crystal display devices, or similar.

When combined and used with a light source exhibiting an emission spectrum having two or more emission peaks, it is preferable that the collimator of this invention be configured by stacking cholesteric liquid crystal layers having, for the respective emission peak wavelengths $(\lambda_{01} < \lambda_{02} < \ldots < \lambda_{on})$, selective-reflection wavelength bands having minimum-value wavelengths $\lambda_{11}, \lambda_{21}, \ldots, \lambda_{n1}$ which satisfy $\lambda_{01} < \lambda_{11}, \lambda_{02} < \lambda_{21}, \ldots, \lambda_{on} < \lambda_{n1}$. Here, there are no restrictions particular on the order of stacking of the cholesteric liquid crystal layers. It is also preferable that the maximum values $(\lambda_{12}, \lambda_{22}, \ldots, \lambda_{n2})$ of the selective-reflection wavelength bands of each of the cholesteric liquid crystal layers satisfy the following relation, in order that the selective-reflection wavelength bands of cholesteric liquid crystal layers corresponding to the respective emission peaks do not contain other emission peak wavelengths.

$$\lambda_{01} < \lambda_{11} < \lambda_{12} < \lambda_{02} < \lambda_{21} < \lambda_{22} < \lambda_{03} < \ldots < \lambda_{0n} < \lambda_{n1} < \lambda_{n2}$$

When a collimator of this invention is a stack of two or more of the above cholesteric liquid crystal layers, the stack can be fabricated by lamination processing, by superposed application, or by other publicly-known methods. In order to improve the adhesive properties of each cholesteric liquid crystal layer, adhesive layers may be inserted between cholesteric liquid crystal layers.

The above cholesteric liquid crystal layers may comprise a single type of liquid-crystalline material, or two or more liquid-crystalline materials. If comprising two or more types of liquid-crystalline materials, a material may be included which by itself cannot form a cholesteric liquid crystal layer. Further, in the above cholesteric liquid crystal layers, it is preferable that the liquid-crystalline materials be fixed in a prescribed alignment (a prescribed helical pitch).

An example of a liquid-crystalline material which can be used in the cholesteric liquid crystal layers of this invention is a composition of a liquid-crystalline polyester, disclosed in Japanese Patent Application Laid-open No. 11-124492, and an optically active liquid-crystalline polyester (the composition being described in [0020] to [0072] of the above patent publication). Also, the liquid crystal polymer described in sections [0023] to [0029] of Japanese Patent Application Laid-open No. 10-319235, or similar, can be used.

When forming a cholesteric liquid crystal layer from the liquid crystal materials of the above examples, an application liquid containing the above liquid-crystalline materials is prepared, and this application liquid is applied onto an alignment film in a prescribed manner to form a layer, the layer is heated to a temperature at or above the glass transition temperature but below the isotropic phase-transition temperature, and the liquid-crystalline polymer is aligned to a prescribed helical pitch to form the layer. Here the helical pitch can be controlled through the heating conditions, conditions of material formulation, and other conditions.

The above cholesteric liquid crystal layers can also be formed by polymerization from optically active monomers having acrylic bases or other polymer bases, mesogen bases and asymmetric carbon atoms in their structures, and from monomers having polymerizable bases and mesogen bases. Specifically, an application liquid containing a mixture of the above monomers (including, as desired, photopolymerization initiation agents) is applied to a substrate, and is polymerized by irradiation with light, to form the layer. The cholesteric liquid crystal layers formed by this method can be stripped from the substrate and handled independently; subsequently, when incorporating into a liquid crystal display element or stacking with other cholesteric liquid crystal layers, handling is easy. If two or more monomers having polymerizable bases are used to form a cholesteric liquid crystal layer by copolymerization, the copolymer is reliably fixed in place with the prescribed alignment by means of a crosslinked structure, so that even when used at high temperatures, optical properties are not degraded, and so this is preferable. The method of fabrication of the above monomers and cholesteric liquid crystal layers is described in detail in Japanese Patent Application Laid-open No. 6-281814.

It is preferable that the thickness of the above cholesteric liquid crystal layers be 0.5 to 50 $\mu$m, and still more preferable that the thickness be 2 to 10 $\mu$m. If the thickness of the cholesteric liquid crystal layer is within the above range it is easy to control the helical pitch at a prescribed alignment, and demands for thinness can be satisfied.

When a collimator of this invention comprises a stack of two or more of the above cholesteric liquid crystal layers, it is preferable that the thickness of the above collimator be between 1 and 100 $\mu$m, and still more preferable that the thickness be between 4 and 20 $\mu$m.

Dielectric Multilayer Film

Figure 3:
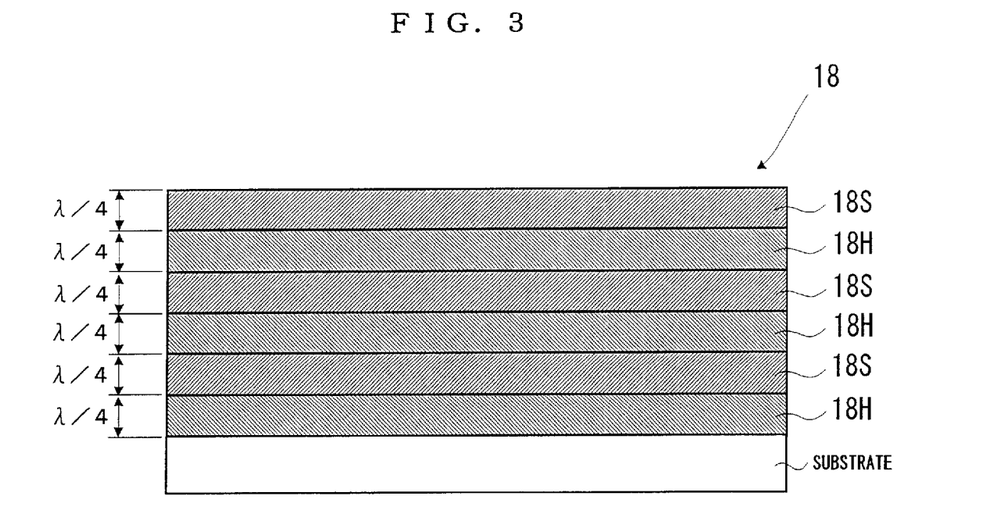
FIG. 3 is a cross-sectional view which shows schematically an example of a collimator, formed from a dielectric multilayer film, of this invention.

FIG. 3 is an enlarged cross-sectional view showing one example of a dielectric multilayer film comprised by a collimator 18 of this invention.

This dielectric multilayer film is a multilayer film formed by layering on a transparent substrate in alternation several, or several tens, of layers of two dielectric thin films of thickness $\lambda/4$, with different refractive indices. Physically, part of the light waves propagating through this dielectric multilayer film undergoes multiple reflections in each film, and interference occurs. As a result, only a wavelength determined by the product of the thickness of the dielectric thin film and the effective refractive index of the film for the guided light is selectively transmitted. The central transmission wavelength of this filter has an angular dependence with respect to the incident beam. Hence if the angle of incidence is varied, the transmitted wavelength can be changed.

Specifically, the dielectric multilayer film comprises alternating layers of high-refractive index films 18H and low-refractive index films 18S (normally ten or more layers), with optical film thickness of all films $\lambda_M/4$ (where $\lambda_M$ is $(\lambda_1+\lambda_2)/2$, in which $\lambda_1$, $\lambda_2$ represent the wavelengths at which reflectivity is 50% of the maximum reflectivity), formed on plastic, quartz, or other transparent substrate by a vacuum evaporation method or similar to a total thickness of approximately 0.2 to 20 $\mu$m.

This dielectric multilayer film has a high-reflectivity band (selective-reflection wavelength band) of width $\Delta\lambda$, centered on the wavelength $\lambda_M$ which is larger than the maximum-value wavelength $\lambda_0$ of the light source emission spectrum; high transmittance is exhibited in the wavelength regions on either side of this. If the refractive index of the high-refractive index films 18H is $n_H$, the refractive index of the low-refractive index films 18S is $n_S$, and the refractive index of the substrate is $n_B$, then the high-reflectivity band $\Delta\lambda$ and reflectivity R of the alternating multilayer film 18H (18S18H)$^m$G (where m is the number of repetitions and G represents the substrate) are given by the following equation (2).

$$\Delta\lambda = \lambda_M/45 \cdot \sin^{-1}(n_H-n_S)/(n_H+n_S)$$
$$R=[(n_B \cdot n_S^{2m}-n_H^{2(m+1)})/(n_B \cdot n_S^{2m}+n_H^{2(m+1)})]^2 \qquad (2)$$

FIG. 4 shows the emission spectrum of a light source 14, and the selective-reflection wavelength band and the incident angle dependence of the latter for a dielectric multilayer film.

The light source 14 exhibits an emission spectrum $S_0$ having an emission peak at the wavelength $\lambda_0$ (435 nm). The dielectric multilayer film has a selective-reflection wavelength band $R_0$ with respect to perpendicularly-incident light in the wavelength range $\lambda_1$ to $\lambda_2$ ($\lambda_1<\lambda_2$). When light is incident on the dielectric multilayer film at an angle other than the perpendicular, this selective-reflection wavelength band $R_0$ is shifted to shorter wavelengths according to the angle of incidence. As shown in FIG. 4, for light incident at the angles $\alpha_1$, $\alpha_2$ and $\alpha_3$ ($\alpha_1<\alpha_2<\alpha_3$; for example, $\alpha_1=10°$, $\alpha_2=20°$, and $\alpha_3=40°$), the dielectric multilayer film has selective-reflection wavelength bands $R_1$, $R_2$ and $R_3$ respectively, shifted to wavelengths shorter than $R_0$. That is, the wavelength $\lambda_0$ is included in all of the selective-reflection wavelength bands $R_1$, $R_2$ and $R_3$, and light components at wavelength $\lambda_0$ which are incident on the dielectric multilayer film at the angles $\alpha_1$, $\alpha_2$ and $\alpha_3$ are reflected.

In FIG. 1, light (of wavelength $\lambda_0$) irradiated from the light source 14 is incident on the light-diffusing layer 16

(either directly, or after reflection by the light-reflecting layer 12), its direction of propagation is scattered, and it is incident on the collimator 18.

Light incident perpendicularly on the dielectric multilayer film comprised by the collimator 18 satisfies the relation $\lambda_0 < \lambda_1$, and so is not selectively reflected but is transmitted unchanged through the dielectric multilayer film, and having been perpendicularly incident on the dielectric multilayer film, is emitted from the collimator 18 as parallel rays.

On the other hand, when light is incident on the dielectric multilayer film at angles $\alpha_1$, $\alpha_2$ or $\alpha_3$, because the selective-reflection wavelength band exhibited by the dielectric multilayer film is shifted to shorter wavelengths according to the angle of incidence, the wavelength $\lambda_0$ is included in each of the [shifted] selective-reflection wavelength bands $R_1$, $R_2$ and $R_3$, and so the light is reflected. The direction of propagation of the reflected light is again scattered by the light-diffusing layer 16, and together with light from the light source 14 and light reflected from the light-reflecting layer 12, is again incident on the dielectric multilayer film. Of this, only light which is incident perpendicularly on the dielectric multilayer film becomes parallel rays and is emitted from the collimator 18 by action similar to that described above. By repeatedly passing through similar optical paths, the light becomes nearly completely changed to parallel rays, and is emitted from the collimator 18.

Figure 7:
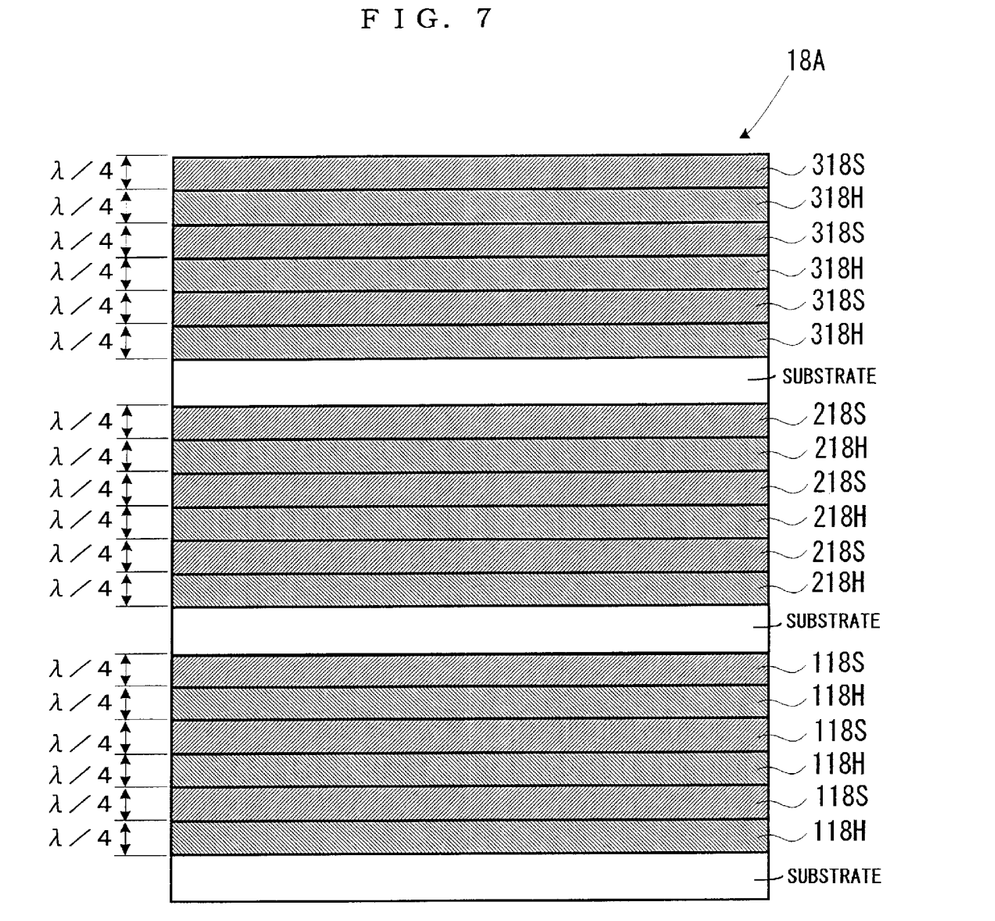
FIG. 7 is a cross-sectional view which shows schematically an example of a collimator, formed from a dielectric multilayer film, of this invention; and, FIG. 8 is a graph showing the emission spectrum of a light source which can be used in this invention, and selective-reflection wavelength bands.

Next, FIG. 7 shows an enlarged cross-sectional view of a dielectric multilayer film comprised by the collimator 18A.

This collimator 18A comprises a stack, on a substrate, of a first dielectric multilayer film formed from alternating layers of high-refractive index films 118H and low-refractive index films 118S; a second dielectric multilayer film formed from alternating layers of high-refractive index films 218H and low-refractive index films 218S; and a third dielectric multilayer film formed from alternating layers of high-refractive index films 318H and low-refractive index films 318S.

The first dielectric multilayer film exhibits a selective-reflection wavelength band with respect to perpendicularly-incident light, in the wavelength range $\lambda_{11}$ to $\lambda_{12}$ ($\lambda_{11} < \lambda_{12}$).

The second dielectric multilayer film exhibits a selective-reflection wavelength band with respect to perpendicularly-incident light, in the wavelength range $\lambda_{21}$ to $\lambda_{22}$ ($\lambda_{21} < \lambda_{22}$).

The third dielectric multilayer film exhibits a selective-reflection wavelength band with respect to perpendicularly-incident light, in the wavelength range $\lambda_{31}$ to $\lambda_{32}$ ($\lambda_{31} < \lambda_{32}$).

FIG. 8 shows the emission spectrum of a light source 14A, and the selective-reflection wavelength bands of the above first through third dielectric multilayer films.

The light source 14A exhibits an emission spectrum $S_0'$ having emission peaks at wavelengths $\lambda_B$, $\lambda_G$ and $\lambda_R$. The first dielectric multilayer film has a selective-reflection wavelength band $R_{01}$ for perpendicularly-incident light in the wavelength range $\lambda_{11}$ to $\lambda_{12}$ ($\lambda_{11} < \lambda_{12}$); the second dielectric multilayer film has a selective-reflection wavelength band $R_{02}$ for perpendicularly-incident light in the wavelength range $\lambda_{21}$ to $\lambda_{22}$ ($\lambda_{21} < \lambda_{22}$); and the third dielectric multilayer film has a selective-reflection wavelength band $R_{03}$ for perpendicularly-incident light in the wavelength range $\lambda_{31}$ to $\lambda_{32}$ ($\lambda_{31} < \lambda_{32}$). These wavelengths satisfy the following relation.

$$\lambda_B < \lambda_{11} < \lambda_{12} < \lambda_G < \lambda_{21} < \lambda_{22} < \lambda_R < \lambda_{31} <_{32} < 1000 \text{ nm}$$

Here, if $(\lambda_{11} + \lambda_{12})/2 = \lambda_{M1}$ (where $\lambda_{11}$, $\lambda_{12}$ represent the wavelengths at which reflectivity is 50% of the maximum reflectivity), the above first dielectric multilayer film is a $\lambda/4$ alternating multilayer film, formed by evaporation deposition in alternation of high-refractive index films and low-refractive index films, the optical film thickness of each of which is $\lambda_{M1}/4$.

If $(\lambda_{21} + \lambda_{22})/2 = \lambda_{M2}$ (where $\lambda_{21}$, $\lambda_{22}$ represent the wavelengths at which reflectivity is 50% of the maximum reflectivity), the above second dielectric multilayer film is a $\lambda/4$ alternating multilayer film, formed by evaporation deposition in alternation of high-refractive index films and low-refractive index films, the optical film thickness of each of which is $\lambda_{m2}/4$.

If $(\lambda_{31} + \lambda_{32})/2 = \lambda_{M3}$ (where $\lambda_{31}$, $\lambda_{32}$ represent the wavelengths at which reflectivity is 50% of the maximum reflectivity), the above third dielectric multilayer film is a $\lambda/4$ alternating multilayer film, formed by evaporation deposition in alternation of high-refractive index films and low-refractive index films, the optical film thickness of each of which is $\lambda_{M3}/4$.

In cases in which light is incident on the first through third dielectric multilayer films at angles other than perpendicular, the selective-reflection wavelength bands $R_{01}$, $R_{02}$ and $R_{03}$ are shifted to shorter wavelengths according to the incidence angle. For example, similarly to the incidence angle dependence of the dielectric multilayer film selective-reflection wavelength band shown in FIG. 4, for light incident at angles $\alpha_1$, $\alpha_2$ and $\alpha_3$ ($\alpha_1 < \alpha_2 < \alpha_3$; for example, $\alpha_1 = 10°$, $\alpha_2 = 20°$ and $\alpha_3 = 40°$), the [first] dielectric multilayer film has selective-reflection wavelength bands $R_{11}$, $R_{12}$ and $R_{13}$ (not shown) shifted to shorter wavelengths than $R_{01}$. The wavelength $\lambda_B$ is included in all of $R_{11}$, $R_{12}$ and $R_{13}$, so that light components at wavelength $\lambda_B$, incident on the first dielectric multilayer film at angles $\alpha_1$, $\alpha_2$ or $\alpha_3$, are reflected.

Similarly, the second and third dielectric multilayer films have selective-reflection wavelength bands which, for light incident at angles other than perpendicular, are shifted to shorter wavelengths relative to $R_{02}$ and $R_{03}$ respectively. These selective-reflection wavelength bands shifted to shorter wavelengths contain the wavelengths $\lambda_G$ and $\lambda_R$ respectively, so that light at the wavelengths $\lambda_G$ and $\lambda_R$ which is incident at angles other than perpendicular on the second and third dielectric multilayer films is reflected.

In FIG. 5, light irradiated from the light source 14A (at wavelengths $\lambda_B$, $\lambda_G$ and $\lambda_R$) is incident on the light-diffusing layer 16 (either directly, or after reflection by the light-reflecting layer 12), the direction of propagation is scattered, and the light is incident on the collimator 18A. Light components at wavelength $\lambda_B$ are changed to parallel rays by the first dielectric multilayer film; light components at wavelength $\lambda_G$ are changed to parallel rays by the second dielectric multilayer film; and light components at wavelength $\lambda_R$ are changed to parallel rays by the third dielectric multilayer film. As a result, parallel rays at three wavelengths corresponding to blue, green and red are emitted from the collimator 18A.

A backlight system of this invention may comprise, as desired and according to the application, a light-guiding plate, polarizing filter, and similar components.

Next, the dielectric multilayer films comprised by the collimator of this invention are explained in further detail.

The collimator of this invention has at least one layer, and preferably three layers of dielectric multilayer film. This dielectric multilayer film is characterized in that it exhibits selective-reflection wavelength bands for perpendicularly-incident light in the wavelength range $\lambda_1$ to $\lambda_2$ ($\lambda_1 < \lambda_2$), and satisfies the relation $\lambda_0 < \lambda_1$ with respect to the maximum wavelength $\lambda_0$ in the emission spectrum of the light source with which the collimator is used in combination. Here the central wavelength of the selective-reflection wavelength band is determined by the optical thickness of the dielectric multilayer film, and the selective-reflection wavelength band is determined by the refractive indices of the low-refractive index film and the high-refractive index film comprised by the dielectric multilayer film. Hence by selecting the materials used in the dielectric multilayer film, and controlling the film thickness, a dielectric multilayer film can be obtained which satisfies the above relation with respect to the emission peak wavelength $\lambda_0$ of the light source with which the collimator is used in combination.

Here it is desirable that the difference between the maximum-value wavelength $\lambda_2$ and the minimum-value wavelength $\lambda_1$ of the selective-reflection wavelength band exhibited by the above dielectric multilayer film be 50 nm or greater, and more preferably be 70 nm or greater. If the difference between the maximum-value wavelength $\lambda_2$ and the minimum-value wavelength $\lambda_1$ is 50 nm or less, moderately oblique light is cut out, but as the angle of incidence increases, there is the possibility that light may again be transmitted.

It is preferable that the above dielectric multilayer films satisfy the relation $(\lambda_1-\lambda_0) \leq 20$ nm. If this relation is satisfied, even when used in combination with a backlight exhibiting a sharp emission spectrum, with an emission spectrum half-band width of 20 nm or less, emitted light can be obtained which is scattered within only $\pm 10°$ from completely parallel rays, and a collimator with sufficient characteristics for practical use is obtained. Further, even when used with a light source exhibiting a still sharper emission spectrum, with an emission spectrum half-band width of 15 nm or less, if $(\lambda_1-\lambda_0) \leq 10$ nm is satisfied, emitted light can be obtained which is scattered within only $\pm 10°$ from completely parallel rays, and a collimator with sufficient characteristics for practical use is obtained.

When combined for use with a light source exhibiting an emission spectrum which has two or more emission peaks, it is preferable that the collimator of this invention comprise a stack of dielectric multilayer films having, for the respective emission peak wavelengths ($\lambda_{01}<\lambda_{02}< \ldots <\lambda_{on}$), selective-reflection wavelength bands with minimum wavelengths $\lambda_{11}, \lambda_{21}, \ldots, \lambda_{n1}$ which satisfy the relations $\lambda_{01}<\lambda_{11}$, $\lambda_{02}<\lambda_{21}, \ldots, \lambda_{on}<\lambda_{n1}$. There are no restrictions in particular on the order of stacking of the dielectric multilayer films. It is also preferable that the maximum values ($\lambda_{12}$, $\lambda_{22}, \ldots, \lambda_{n2}$) of the selective-reflection wavelength bands of each of the dielectric multilayer films satisfy the following relation, in order that the selective-reflection wavelength bands of dielectric multilayer films corresponding to the respective emission peaks do not contain other emission peak wavelengths.

$$\lambda_{01}<\lambda_{11}<\lambda_{12}<\lambda_{02}<\lambda_{21}<\lambda_{22}<\lambda_{03}< \ldots <\lambda_{on}<\lambda_{n1}<\lambda_{n2}$$

Here, $\lambda_{11}$, $\lambda_{12}$, $\lambda_{21}$, $\lambda_{22}$, . . . represent wavelengths at which the reflectivity is 50% of the maximum reflectivity.

Materials for use in such dielectric multilayer films can be selected as appropriate to the purpose and are not limited in particular, so long as the characteristics described above are present; examples include $TiO_2$, $CeO_2$, $Ta_2O_5$, $ZrO_2$, $Sb_2O_3$, $HfO_2$, $La_2O_3$, MgO, $Al_2O_3$, $SiO_2$, $In_2O_3$, ZnO, $SnO_2$, $Cd_2SnO_4$, $CdIn_2O_4$, $Zn_2SnO_4$, $ZnSnO_3$, $MgIn_2O_4$, $Zn_2In_2O_5$, and $In_3Sn_3O_{12}$. Of these, it is preferable that $TiO_2$ be used as the high-refractive index film, and $SiO_2$ be used as the low-refractive index film.

No restrictions in particular are placed on the method of fabrication of the above dielectric multilayer films; methods such as ion implantation, ion beam evaporation or other vacuum evaporation methods, sputtering or other physical vapor-phase deposition (PVD) methods, chemical vapor-phase deposition (CVD) methods, or other methods may be adopted as appropriate to the purpose.

When a collimator of this invention is a stack of two or more of the above dielectric multilayer films, the stack may be fabricated by lamination processing, by superposed application, or by other publicly-known methods. In order to improve the adhesive properties of each dielectric multilayer film, adhesive layers may be inserted between dielectric multilayer films.

Collimators of this invention may comprise, in addition to the above dielectric multilayer film, substrates, alignment films, and other components as desired.

The collimator and backlight system of this invention can be used not only in clocks, calculators, Japanese word processors, computer terminals, and various other liquid crystal displays, but also in illuminated signs, various types of lighting, and other devices.

By means of this invention, a novel flat plate collimator can be provided which can be fabricated easily and inexpensively.

Also by means of this invention, a high-quality backlight system can be provided which is capable of irradiation of parallel rays, and particularly when employed in liquid crystal displays can improve the display contrast, viewing angle dependence, and other display characteristics.

In the above, the collimator and backlight system of this invention have been explained in detail; however, this invention is not limited to the above aspects, and various modifications may be employed so long as there is no deviation from the technical gist of this invention.

What is claimed is:

1. A collimator, comprising a cholesteric liquid crystal layer which exhibits a selective-reflection wavelength band with respect to perpendicularly-incident light in the wavelength range $\lambda_1$ to $\lambda_2$ ($\lambda_1<\lambda_2$), wherein the relation $\lambda_0<\lambda_1$ is satisfied for the maximum-emission wavelength $\lambda_0$ of the emission spectrum of a light source with which the collimator is combined for use.

2. The collimator according to claim 1, comprising a stack of two of said cholesteric liquid crystal layers, wherein the helical pitches, average refractive indices and birefringence of the cholesteric liquid crystal layers are substantially equal, and moreover the helical rotation directions are mutually different.

3. The collimator according to claim 1, wherein said cholesteric liquid crystal layer is of thickness 0.5 to 50 μm.

4. The collimator according to claim 1, wherein said cholesteric liquid crystal layer is a liquid-crystalline material fixed in place.

5. The collimator according to claim 1, wherein $(\lambda_2-\lambda_1) \geq 50$ nm.

6. The collimator according to claim 1, wherein $(\lambda_1-\lambda_0) \leq 20$ nm.

7. The collimator according to claim 1, wherein $(\lambda_1-\lambda_0) \leq 10$ nm.

8. The collimator according to claim 1, comprising a stack of:

a first cholesteric liquid crystal layer which exhibits, for perpendicularly-incident light, a selective-reflection wavelength band in the wavelength range $\lambda_{11}$ to $\lambda_{12}$ ($\lambda_{11}<\lambda_{12}$);

a second cholesteric liquid crystal layer which exhibits, for perpendicularly-incident light, a selective-reflection wavelength band in the wavelength range $\lambda_{21}$ to $\lambda_{22}$ ($\lambda_{21}<\lambda_{22}$); and, a third cholesteric liquid crystal layer which exhibits, for perpendicularly-incident light, a selective-reflection wavelength band in the wavelength range $\lambda_{31}$ to $\lambda_{32}$ ($\lambda_{31}<\lambda_{32}$);

said collimator being used in combination with a backlight having maximum emission at the wavelengths $\lambda_B$, $\lambda_G$ and $\lambda_R$, and satisfying the following relations;

420 nm $\leq \lambda_B \leq$ 480 nm
520 nm $\leq \lambda_G \leq$ 580 nm
585 nm $\leq \lambda_R \leq$ 685 nm $\lambda_B < \lambda_{11} < \lambda_{12} < \lambda_G < \lambda_{21} < \lambda_{22} < \lambda_R < \lambda_{31} < \lambda_{32} <$ 1000 nm.

9. A backlight system, comprising a light-reflecting layer, a light source exhibiting an emission spectrum having a maximum emission at wavelength $\lambda_0$, a light-diffusing layer, and the collimator according to claim 1.

10. The backlight system according to claim 9, wherein the half-band width of the emission spectrum of said light source is 20 nm or less.

11. The backlight system according to claim 9, wherein the half-band width of the emission spectrum of said light source is 15 nm or less.

12. The backlight system according to claim 9, wherein said light source is a three-wavelength cold-cathode tube.

13. The collimator according to claim 1, wherein the relation $\lambda_0 < \lambda_1$ is satisfied for a maximum-emission wavelength $\lambda_0$ of an emission spectrum of a light source of a backlight system with which the collimator is combined for use.

14. A collimator, comprising a dielectric multilayer film which exhibits a selective-reflection wavelength band with respect to perpendicularly-incident light in the wavelength range $\lambda_1$ to $\lambda_2$ ($\lambda_1 < \lambda_2$), wherein the relation $\lambda_0 < \lambda_1$ is satisfied for the maximum-emission wavelength $\lambda_0$ of the emission spectrum of a light source with which the collimator is combined for use.

15. The collimator according to claim 14, wherein said dielectric multilayer film is a $\lambda/4$ alternating multilayer film, formed by evaporation deposition in alternation of high-refractive index films and low-refractive index films, the optical film thickness of each of which is $\lambda_M/4$, where $\lambda_M$ is $(\lambda_1 + \lambda_2)/2$, when $\lambda_1$ and $\lambda_2$ represent wavelengths at which the reflectivity is 50% of the maximum reflectivity.

16. The collimator according to claim 15, wherein the relation $\lambda_0 < \lambda_1$ is satisfied for a maximum-emission wavelength $\lambda_0$ of an emission spectrum of a light source of a backlight system with which the collimator is combined for use.

17. The collimator according to claim 14, wherein ($\lambda_2 - \lambda_1$) $\geq$ 50 nm.

18. The collimator according to claim 14, wherein ($\lambda_1 - \lambda_0$) $\leq$ 20 nm.

19. The collimator according to claim 14, wherein ($\lambda_1 - \lambda_0$) $\leq$ 10 nm.

20. The collimator according to claim 14, comprising a stack of:
    a first dielectric multilayer film which exhibits, for perpendicularly-incident light, a selective-reflection wavelength band in the wavelength range $\lambda_{11}$ to $\lambda_{12}$ ($\lambda_{11} < \lambda_{12}$);
    a second dielectric multilayer film which exhibits, for perpendicularly-incident light, a selective-reflection wavelength band in the wavelength range $\lambda_{21}$ to $\lambda_{22}$ ($\lambda_{21} < \lambda_{22}$); and,
    a third dielectric multilayer film which exhibits, for perpendicularly-incident light, a selective-reflection wavelength band in the wavelength range $\lambda_{31}$ to $\lambda_{32}$ ($\lambda_{31} < \lambda_{32}$);
    said collimator being used in combination with a backlight having maximum emission at the wavelengths $\lambda_B$, $\lambda_G$ and $\lambda_R$, and satisfying the following relations;

420 nm $\leq \lambda_B \leq$ 480 nm
520 nm $\leq \lambda_G \leq$ 580 nm
585 nm $\leq \lambda_R \leq$ 685 nm $\lambda_B < \lambda_{11} < \lambda_{12} < \lambda_G < \lambda_{21} < \lambda_{22} < \lambda_R < \lambda_{31} < \lambda_{32} <$ 1000 nm.

21. The collimator according to claim 20, wherein:
    said first dielectric multilayer film is a $\lambda/4$ alternating multilayer film, formed by evaporation deposition in alternation of high-refractive index films and low-refractive index films, the optical film thickness of each of which is $\lambda_{M1}/4$, where $\lambda_{M1}$ is $(\lambda_{11} + \lambda_{12})/2$, when $\lambda_{11}$ and $\lambda_{12}$ represent wavelengths at which the reflectivity is 50% of the maximum reflectivity;
    said second dielectric multilayer film is a $\lambda/4$ alternating multilayer film, formed by evaporation deposition in alternation of high-refractive index films and low-refractive index films, the optical film thickness of each of which is $\lambda_{M2}/4$, where $\lambda_{M2}$ is $(\lambda_{21} + \lambda_{22})/2$, when $\lambda_{21}$ and $\lambda_{22}$ represent wavelengths at which the reflectivity is 50% of the maximum reflectivity; and,
    said third dielectric multilayer film is a $\lambda/4$ alternating multilayer film, formed by evaporation deposition in alternation of high-refractive index films and low-refractive index films, the optical film thickness of each of which is $\lambda_{M3}/4$, where $\lambda_{M3}$ is $(\lambda_{31} + \lambda_{32})/2$, when $\lambda_{31}$ and $\lambda_{32}$ represent wavelengths at which the reflectivity is 50% of the maximum reflectivity.

22. A backlight system, comprising a light-reflecting layer, a light source exhibiting an emission spectrum having a maximum emission at wavelength $\lambda_0$, a light-diffusing layer, and the collimator according to claim 5.

23. The backlight system according to claim 22, wherein the half-band width of the emission spectrum of said light source is 20 nm or less.

24. The backlight system according to claim 22, wherein the half-band width of the emission spectrum of said light source is 15 nm or less.

25. The backlight system according to claim 22, wherein said light source is a three-wavelength cold-cathode tube.

* * * * *